United States Patent [19]
Caruso et al.

[11] Patent Number: 5,466,777
[45] Date of Patent: Nov. 14, 1995

[54] XANTHENE POLYMERS, AND COPOLYMERS, AND METHOD FOR MAKING

[75] Inventors: Andrew J. Caruso; Julia L. Lee, both of Schenectady, N.Y.

[73] Assignee: General Electric Company, Schenectady, N.Y.

[21] Appl. No.: 354,356

[22] Filed: Dec. 15, 1994

Related U.S. Application Data

[63] Continuation-in-part of Ser. No. 218,383, Mar. 28, 1994, abandoned.

[51] Int. Cl.$^6$ .................................................. C08G 63/18
[52] U.S. Cl. ..................... 528/298; 528/272; 528/279; 528/302; 528/307; 528/308; 528/308.6; 528/335; 528/339
[58] Field of Search .................................. 528/272, 279, 528/298, 302, 307, 308, 308.6, 335, 339

[56] References Cited

U.S. PATENT DOCUMENTS

| | | | |
|---|---|---|---|
| 4,250,097 | 2/1981 | Pfister | 549/393 |
| 4,714,669 | 12/1987 | Pfeifer et al. | 430/325 |
| 5,051,520 | 9/1991 | Trofimenko | 549/388 |

OTHER PUBLICATIONS

CA101(21): 191627w.
CA120(10): 107774d.
CA14(7): 61885m.

*Primary Examiner*—Samuel A. Acquah
*Attorney, Agent, or Firm*—William H. Pittman

[57] ABSTRACT

Xanthene polyesters and polyamides are provided resulting from the reaction of alkylene, cycloaliphatic or aromatic diols or organo diamines with xanthene dicarboxylic esters or xanthene dicarboxylic acid halides. These amorphous, or crystalline film forming, high performance thermoplastics which are useful in automotive applications, and include copolymers and blends of such xanthene polymers.

12 Claims, No Drawings

XANTHENE POLYMERS, AND COPOLYMERS, AND METHOD FOR MAKING

CROSS-REFERENCE TO RELATED APPLICATIONS

This application is a continuation-in-part of application Ser. No. 08/218,383 filed Mar. 28, 1994, now abandoned.

BACKGROUND OF THE INVENTION

The present invention relates to xanthene polyesters and polyamides and copolymers thereof, and esterification, transesterification and amidation methods which are used in the synthesis of such xanthene containing polymers and copolymers. There are employed in the synthesis of such xanthene containing polymers, xanthene containing dicarboxylic acids, and derivatives thereof, such as the corresponding acid halides and esters.

In Pfeifer et al., U.S. Pat. No. 4,714,669, there are provided radiation sensitive thioxanthone and xanthone containing polycondensates. These polymers are prepared by effecting reaction between a diphenyl thioxanthone dicarboxylate, such as diphenyl thioxanthone-10,10-dioxide-2,6-dicarboxylate, or a xanthone dicarboxylate, such as diphenyl xanthone-3,6-dicarboxylate, and an alkylene diol. Pfeifer et al. report, that some of the thioxanthone and xanthone polycondensates are thermoplastic and high melting. However, due to the radiation sensitivity of the thioxanthone and xanthone structures, the utility of these materials is often restricted to applications in which photolability is advantageous.

It would be desirable therefore to provide high performance xanthene containing thermoplastics, such as xanthene polyesters, polyamides, and copolymers thereof which can be applied in a variety of applications, for example high performance films, fibers, injected molded or extruded parts, tubing, wire coatings, automotive applications such as connectors, computer housings, and packaging film.

As shown in copending application Ser. No. 08/218,397, polyalkylated xanthenes can be made by transforming a bisphenol A (BPA) containing material, such as a BPA tar, or BPA, with an alkylphenol, such as m or p cresol, or a mixture thereof, or a dialkylphenol, such as 3,4-dimethylphenol, in the presence of an acid catalyst. There is produced a nearly quantitative yield of phenol and a satisfactory yield of a polyalkylated substituted 9,9-dimethylxanthene included within the formula,

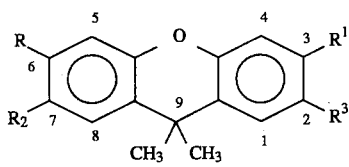

where R, R$^1$, R$^2$, and R$^3$ are members selected from the group consisting of the same or different C$_{(1-4)}$alkyl radicals and a mixture consisting of hydrogen and the same or different C$_{(1-4)}$alkyl radicals. These xanthenes can be readily oxidized to xanthene carboxylic acids. Among these polyalkylated 9,9-dimethyl xanthenes, there are included dialkyl xanthenes which can be substituted with two C$_{(1-4)}$ alkyl radicals, which can be the same or different, and located in the 3,6 position, the 2,7 position, or the 2,6 or 3,7 position. These dialkyl 9,9-dimethylxanthenes can be oxidized to xanthene dicarboxylic acids selected from the group consisting of,

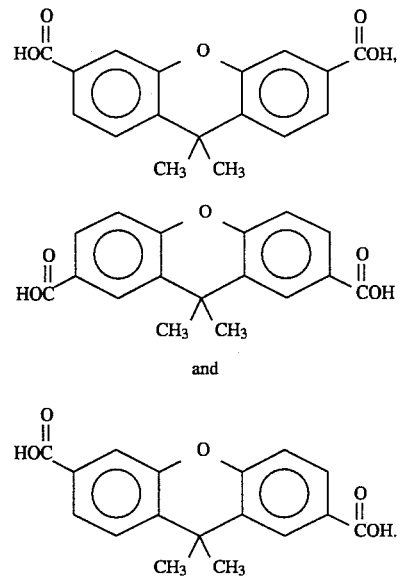

and

The above xanthene dicarboxylic acids also can be converted to their corresponding acid halides and dialkyl esters, such as the 2,6 dimethyl ester, the 2,7 diethyl ester, the 2,6 dipropyl ester, or the corresponding diaryl esters, such as the 3,6 diphenyl ester, by standard procedures.

SUMMARY OF THE INVENTION

The present invention is based on the discovery that high performance xanthene polyesters and polyamides can be made by effecting reaction between an organo diamine, or a diol, such as a polyalkylene glycol, a cycloaliphatic diol, or an aromatic diol, as defined hereinafter, and a xanthene dicarboxylic acid, ester or acid halide included within the formula,

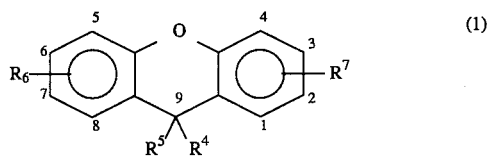

where R$^4$ and R$^5$ are selected from the same or different C$_{(1-20)}$ organic radicals, such as alkyl, aryl, or substituted derivatives, such as haloalkyl or haloaryl, and preferably, methyl or phenyl, and R$^6$ and R$^7$ are preferably attached in the 3,6 position, the 2,7 position, or the 2,6 or 3,7 position, and selected from the group consisting of COOH, —COX and —COOR$^8$ groups, where X is a halogen radical and R$^8$ is a C$_{(1-13)}$ organic radical, such as an alkyl or aryl radical and preferably methyl or phenyl. Some of the xanthene dicarboxylic acid esters included within formula (1) and methods for making are shown in copending application Ser. No. 08/218,397.

The high performance xanthene polyesters incorporating the 9,9-disubstituted xanthene dioates are new and differ markedly in their physical properties from materials based upon known polyester components such as terephthalate and naphthalene-2,6-dioate. In particular, the new materials are generally found to be amorphous and resistant to crystallization, whereas corresponding materials based upon terephthalate (PET and PBT), or naphthalene 2,6-dioate (PEN and PBN) are highly crystalline or readily convertible thereto. In some instances, crystalline xanthene polyesters may be obtained as well. Accordingly, a polyester can be prepared from dimethyl 9,9-dimethylxanthene-3,6-dicarboxylate hexanediol and 1,4-cyclohexanedimethanol having a melting point of 292° C.

Polyesters based on xanthene dioates have been found to have significantly higher glass transition temperatures (Tg's) than the corresponding terephthalate or naphthalene-2,6-dioate based materials. Thus, polymer prepared from dimethyl 9,9-dimethylxanthene-3,6-dioate and ethylene glycol has been found to have a glass transition temperature of 164° C., whereas the corresponding polyester prepared from dimethyl terephthalate and ethylene glycol (PET) has a glass transition temperature of 82° C. Because of their higher glass transition temperatures, polyesters based upon 9,9-dimethylxanthene dicarboxylates can be used as heat resistant thermoplastics in applications requiring higher Tg materials.

The xanthene polyesters also may be blended with other materials, such as polysulfones, polycarbonates, polyarylates, polyesters, polyamides, polyimides, polyetherimides or polyethers in order to provide blends having improved properties. In addition, xanthene diesters may be reacted with diols, or mixtures thereof, in the presence of other monomeric aliphatic or aromatic organic diesters or diacids, such as dimethyl tere- or isophthalate, or dimethyl naphthalene dicarboxylate to form copolymers, where the copolymers can have from 1–90 mole % of such aliphatic or aromatic units based on the total moles of xanthene units and aliphatic units, aromatic units or a mixture thereof. Among the organic diacid derivatives which can be used in addition to isophthalic, terephthalic and naphthalenedioic acids, such as 2,6-naphthalene dioic acid, are aliphatic acids, such as adipic acid.

STATEMENT OF THE INVENTION

There is provided by the present invention, a xanthene polyester comprising chemically combined units of the formula,

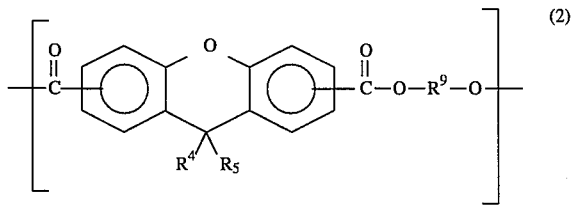

where $R^4$ and $R^5$ are as previously defined, and $R^9$ is an organic divalent radical selected from the group consisting of a $C_{(2-10)}$ alkenyl radical, a $C_{(4-10)}$ cycloaliphatic, and a $C_{(6-20)}$ aromatic radical.

In a further aspect of the present invention, there is provided a method which comprises, (a) effecting reaction in the presence of a catalytic amount of a transesterfication catalyst, between a xanthene dicarboxylic acid ester included within formula (1), and a diol selected from the group consisting of a $C_{(2-10)}$ alkylene glycol, a $C_{(4-10)}$ cycloaliphatic diol, a $C_{(6-20)}$ aromatic diol, and a mixture of at least one of the aforesaid diols and a dialkyl terephthalate ester, and, (b) heating the mixture of (a) under reduced pressure to effect the separation of volatiles.

In another aspect of the present invention, there is provided a xanthene polyamide comprising chemically combined units of the formula,

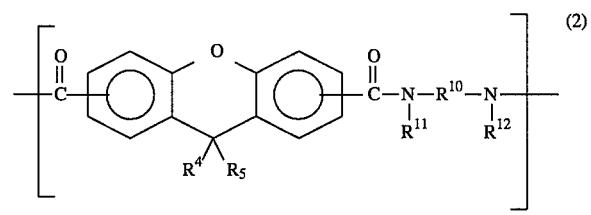

where $R^4$ and $R^5$ are as previously defined, $R^{10}$ is a $C_{(2-20)}$ divalent organic radical, and $R^{11}$ and $R^{12}$ are selected from the same or different radicals selected from the group consisting of hydrogen and a $C_{(1-4)}$ alkyl radical.

Radicals included within R, $R^1$, $R^2$, and $R^3$ are for example methyl, ethyl, propyl and butyl. Radicals included within $R^4$ and $R^5$ are for example alkyl radicals shown for R—$R^3$; haloalkyl radicals, such as chloromethyl, chloropropyl; aryl radicals, such as phenyl, tolyl, xylyl, naphthyl; haloaryl, such as chlorophenyl. Radicals included within $R^8$ are, for example, $C_{(1-4)}$ alkyl radicals shown for R—$R^3$; haloalkyl, such as chloromethyl; $C_{(6-13)}$ aryl radicals, such as phenyl or napthyl; haloaryl, for example, chlorophenyl.

In an additional aspect of the present invention there is provided a method which comprises, (c) effecting reaction between a xanthene dicarboxylic acid ester, or acid halide included within formula (1) and $C_{(2-20)}$ organo aliamine, and, (d) recovering a poly(xanthene dicarboxamide) from the mixture of (c).

Among the xanthene dicarboxylic acids which can be used in the practice of the invention, there are included, 9,9-dimethylxanthene 2,6-dicarboxylic acid, 9,9-dimethylxanthene 2,7-dicarboxylic acid and 9,9-dimethylxanthene 3,6 dicarboxylic acid.

Among the xanthene dicarboxylic acid esters of formula (1), there are included, dimethyl 9,9-dimethylxanthene-2,6dicarboxylate, dimethyl 9,9-dimethylxanthene-2,7dicarboxylate, and dimethyl 9,9-dimethylxanthene-3,6dicarboxylate.

Some of the xanthene dicarboxylic acid halides which are included within formula (1) are for example, 9,9-dimethylxanthene-2,6-dicarboxylic acid chloride, 9,9-dimethylxanthene-2,7-dicarboxylic acid chloride, and 9,9-dimethylxanthene-3,6-dicarboxylic acid chloride.

Synthesis of the xanthene polyesters in accordance with the practice of the invention can be effected by reacting an alkylene glycol and a xanthene dicarboxylic acid ester included within formula (1) in the presence of an effective amount of a transesterification catalyst, or sequential treatment of the corresponding diacid with a esterification agent followed by a transesterification catalyst.

Esterification agents which can be used to convert xanthene dicarboxylic acids to xanthene dicarboxylic esters or oligomers thereof, whereby a two stage conversion of the diacids to high molecular weight polyesters can be effected include acetates of lithium, calcium, magnesium, manganese, zinc, or lead; a tetraalkoxy titanate; oxides of lead, antimony, tin or niobium; or a basic catalyst such as an amine.

Transesterification catalysts which can be employed are exemplified by the use of one or more substances such as tetraorganotitanates $(Ti(OR^{13})_4)$ or a complex titanate derived from them, where $R^{13}$ is a $C_{(1-13)}$ organo radical, such as a $C_{(1-4)}$ alkyl radical, for example, methyl or an aryl radical, such as phenyl, chlorophenyl, and naphthyl; an organotin compound such as dibutyltin oxide, dibutyltin dilaurate or dibutyltin $diC_{(1-20)}$alkoxide; oxides or acidic derivatives of antimony, germanium, titanium, lead or niobium; or acetates of antimony, zinc or lead; or protic acids, such as methanesulfonic or phosphoric or other catalysts commonly employed for the preparation of commercial polyesters, such as poly (ethylene terephthalate) or poly (1,4-butylene terephthalate). An effective amount of the esterification agent is from 0.01 to 10% by weight of esterification agent based on the weight of the esterification mixture. An effective amount of the transesterification catalyst is 0.01 to 1% by weight of catalyst based on the transesterification mixture.

There are included among the preferred diols which can be used to make the polyesters of the present invention, compounds, such as ethylene glycol, 1,4-butanediol, cyclohexane-1,4-dimethanol, bisphenol A, and hydroquinone.

In the preparation of the polyesters, reaction can be effected at 0° C. to 300° C. Although the xanthene dicarboxylic acid esters of formula (1) are preferred, a variety of other methods can be used in the polyester synthesis. For example, an interfacial reaction between an aqueous salt of an aromatic diol and a xanthene diacid chloride dissolved in an organic solvent can be used. In addition, direct two stage esterification-polymerization can be carried out on the free acid with other diacid derivatives such as a dialkyl terephthalate, for example dimethyl terephthalate.

Preparation of the xanthene polyamides can be achieved by effecting reaction between a xanthene dicarboxylic acid ester or halide, such as the corresponding chloride included within formula (1), and a polyalkylenediamine or an appropriate aryl diamine at a temperature of 0° C. to 300° C. Among the polyalkylenediamines which can be used are compounds such as, ethylenediamine, 1,4-tetramethylenediamine and 1,6-hexamethylenediamine. Aryl diamines are metaphenylene and para-phenylene diamine In certain instances, an organic solvent can be used to facilitate the formation and recovery of the resulting xanthene polyamide. In addition, mixtures of divalent arylene diamines and polyalkylenediamines can be used.

The xanthene polyesters and polyamides of the present invention can be characterized with respect to MW and the type of units in the backbone employing gel permeation chromatography; $^1$H- and $^{13}$C-NMR spectroscopy; differential scanning calorimetry and the like.

The xanthene polymers of the present invention can be reinforced with various fillers such as, clay, talc, mica, silica, glass fiber woolastonite, carbon fiber in the proportion of 0.1 to 400 parts of filler, per 100 parts of xanthene polyester or polyamide. Blends with other polymers also can be used such as polysulfones, polycarbonates, polyarylates, polyesters, polyamides, polyimides and polyethers.

In addition, other additives can be used such as plasticizers, nucleants, rubbery impact modifiers, stabilizers, antioxidants, colorants, and flame retardants, such as halogen or phosphorous based which can be used with synergists such as antimony oxide.

In order that those skilled in the art will be better able to practice the present invention, the following examples are given by way of illustration and not by way of limation. All parts are by weight unless otherwise indicated.

EXAMPLE 1

A mixture of 829 mg (9.20 mmol) of 1,4-butanediol, 0.0049 ml of tetra(ethylhexyl)titanate, 2.00 g(6.13 mmol) of dimethyl 9,9-dimethylxanthene-3,6 dioate was heated to 180° C. under a nitrogen atmosphere for 45 minutes and for 250° C. for 30 minutes. During this period, a total of 0.3270 g of methanol and butanediol were collected. After 45 minutes at 250° C., the mixture was subjected to a pressure of 40–100 torr for 30 minutes and to 1 torr for 45 minutes. Strands of product were removed under a nitrogen atmosphere using a spatula and immediately immersed in water. There was obtained 1.59 g (74% yield) of a tough polyester, poly (1,4-butylene 9,9-dimethylxanthene-3,6-dioate) having an $M_n$=55,486 and $M_w$=121,173. Films were prepared on a Carver press at 250° C. and sampled for DSC, Tg=124.3° C. No melting point was observable. Annealing the sample for 24 hours at 180° C. did not induce crystallization of the sample and had no effect on the Tg. $^1$HMNR(CDCl$_3$): δ 1.66 (s, 6H, C$_9$Me$_2$) 1.97 (br s, 4H, CH$_2$ b), 4.35 (br s, 4H, CH$_2$ a), 7.47 (d,J=8 Hz, 2H), 7.71 (d, J=2 Hz, 2H), 7.76 (d,d; J=2,8 Hz, 2H).

EXAMPLE 2

A mixture of 1.0002 g (3.07 mmol) of dimethyl 9,9-dimethylxanthene-3,6 dioate, 595.2 mg (3.07 mmol) of dimethyl terephthalate, 828.6 mg (9.20 mmol) of 1,4-butanediol and 0.0049 mL of tetra(ethylhexyl)titanate was heated to 180° C. under nitrogen for 1 hour. Methanol was collected. The temperature was raised to 250° C. for 0.5 hour. The mixture was heated at 250° C. for an additional 0.5 hour at 40–100 torr and then under high vacuum for 0.75 hour. Hot product was drawn from the mixture under a stream of nitrogen and immediately immersed in cold water. Upon air drying, there was obtained 1.35 g (76% of theory) of a slightly brown glass; $M_n$=98,270, $M_w$ 225,333, Tg=80° C. The material was soluble in chloroform $^1$H-NMR(CDCl$_3$) δ 8.09 (br s, 4H), 7.73 (br m, 4H), 7.47 (br d, 2H), 4.43 (br s, 8H) , 1.97 (br s, 8H), 1.65 (s, 6H, C$_9$(CH$_3$)$_2$).

EXAMPLE 3

A mixture of 828 mg (9.20 mmol) of 1,4-butanediol, 0.0049 mL of tetra(ethylhexyl)titanate, and 2.000 g (6.13 mmol) of dimethyl 9,9-dimethylxanthene-2,7-dioate, was heated to 180° C. under nitrogen for 0.75 hour and then at 250° C. for 0.5 hour. Reaction pressure was reduced to 40–100 torr for 0.5 hour and then to 1 torr for 1 hour. Hot reaction product was removed as strands and immersed immediately in water. Air drying of the tough brown strands afforded a chloroform soluble polyester (1.876 g, 87% of theory) Tg=97° C., Mn=18,650; Mw=40,900. $^1$H-NMR(CDCL$_3$): δ 8.15 (d, J=2 Hz, 2H), 7.90 (d,d; J=2,8 Hz; 2H), 7.08 (d, J=8 Hz, 2H) , 4.42 (br m, 4H), 1.96 (br m, 4H), 1.68 (s, 6H).

EXAMPLE 4

In accordance with the procedure of example 2, a mixture was heated consisting of 595.3 mg (3.07 mmol) of dimethyl terephthalate, 829 mg (9.19 mmol) of 1,4-butanediol, 1.0001 g (3.07 mmol) of dimethyl 9,9-dimethylxanthene-2,7-dioate, and 0.0049 mL of tetra (ethylhexyl) titanate. There was obtained after immersion in cold water and air drying, a copolyester Tg=74° C. Mn=33,800; Mw=161,892. $^1$H-NMR (CDCl$_3$) δ 8.15 (br s, 2H), 8.09 (s, 4H), 7.90 (br d, J~8 Hz, 2H), 7.09 (d, J=8 Hz, 2H), 4.42 (m, 8H), 1.97 (m, 8H), 1.68

(s, 6H).

EXAMPLE 5

In accordance with the procedure of example 4, a mixture was heated to 180° C. for 1 hour consisting of 1.000 g (3.07 mmol) of dimethyl 9,9-dimethylxanthene-3,6 dioate, 356.6 mg (3.07 mmol) of 1,6-hexamethylenediamine, and 0.78 mL of toluene. The mixture was then heated to 270° C. for 2 hours. Strands of hot product were drawn from the resulting mixture, immediately immersed in water and allowed to air dry. There was obtained 989 mg (85% of theory) of an amorphous yellow solid (Tg=147° C.). Based on method of preparation, the product was a polyamide consisting essentially of chemically combined dimethyl 9,9-dimethylxanthene-3,6-carboxy units and 1,6 hexamethylenediamine units. The polyamide was useful as a heat resistant polyamide.

EXAMPLE 6

In accordance with the procedure of example 1, a mixture consisting of 829 mg of 1,4-butanediol, 0.0049 mL of tetra(ethylhexyl)titanate and 2.00 g of dimethyl 9,9-dimethylxanthene-2,6-dicarboxylate was heated from 180° to 250° C. at a pressure of from 760 to 0.5 torr for a period of five hrs. Strands of the hot polymer were drawn from the reaction mixture and were immediately immersed in water. There was obtained 1.554 g of a brownish polymer having a Tg of 100° C. Based on the method of preparation, the polymer was a poly (butylene 9,9-dimethylxanthene-2,6-diaote). The structure was confirmed by $^1$H-NMR(CDCl$_3$): δ 8.14 (br s, $^1$H), 7.91 (br d, J=8.4 Hz, $^1$H), 7.78 (br d, J=8 Hz, 1H), 7.73 (br s, 1H) 7.49 (br d, J=8 Hz, 1H), 7.09 (br d, J=8.4 Hz, 1H), 4.42 (br s, 4H), 1.97 (br s, 4H), 1.67 (s, 6H).

EXAMPLE 7

A mixture of 1.324 g (9.20 mmol) of trans-1,4-cyclohexanedimethanol, 1.7 mg of tetra(ethylhexyl)titanate and 2.00 g (6.13 mmol) of dimethyl 9,9-dimethylxanthene-2,7-dioate was charged to a reaction vessel. The reaction vessel was purged with nitrogen and lowered into a salt bath preheated to 180° C. Methanol began to distill over slowly. After 1 hour at 180° C., the salt bath temperature was raised to 230° C. and maintained at that temperature for 0.5 hr. While continuing to heat the reaction mixture, a pressure of 40–100 torr was maintained for 15 minutes and then changed to 1 torr for 1.5 hours. The reaction was terminated and product was isolated by immersion into water. A chloroform insoluble product (2.100 g, 84% of theory) was isolated as white solid having a melting point of 332° C. Based on method of preparation, the product was a poly(trans-1,4-cyclohexanedimethylene 9,9-dimethylxanthene-2,7dioate).

EXAMPLE 8

Dimethyl 9,9-dimethylxanthene-3,6-dicarboxylate (1.34 g, 4.095 mmol), dimethyl naphthalene-2,6-dicarboxylate (1.00 g, 4.095 mmol) and 1,4-butanediol (1.108 g, 12.3 mmol) containing 2.28 mg of tetra(ethylhexyl)titanate were charged to a reaction vessel equipped with a still head and receiving vessel, mechanical stirrer and vacuum and nitrogen connections. The vessel was purged with nitrogen and lowered into a salt bath at 180°–190° C. and heated for 1 h at ambient pressure during which time methanol distilled into the receiving flask. The salt bath temperature was then increased gradually to 250° C. over 1 h. The pressure of the reaction vessel was then lowered to 40–100 Torr for 30 minutes and the pressure was further reduced to 1 Torr. The viscosity of the reaction mixture increased until it could no longer be stirred. The vacuum was released and the hot polymer was drawn from the reaction vessel with a spatula and tweezers and immediately immersed in water. The tough golden strands of product polyester were then dried in a vacuum oven overnight to give a copolyester (2.30 g) composed of 9,9-dimethylxanthene-3,6-dioate, naphthalene-2,6-dioate and 1,4dioxybutylene units $^1$H-NMR(CDCl$_3$): δ 8.61 (s, 2H), 8.10 (br d, J=8.5 Hz, 2H), 7.98 (br d, J=8.4 Hz, 2H), 7.76 (br d, J=8.1 Hz,2H) 7.71 (br s, 2H), 7.46 (br d, J=8.1 Hz, 2H), 4.48 (br s, 4H), 4.44 (br s, 4H), 2.01 (m, 8H), 1.64 (s,6H). A portion of this material was molded on a Carver press at 260° C. and afforded a tough, clear, nearly colorless film whose DSC showed a Tg of 99° C. and no melting transition in the range of 50°–350° C.

EXAMPLE 9

Dimethyl 9,9-dimethylxanthene-3,6-dicarboxylate (2.00 g, 6.13 mmol) hexanediol (0.1086 g, 0.92 mmol), tetraethylhexyltitanate (TOT, 3.7 mg) and trans-1,4-cyclohexanedimethanol (1.1926 g, 8.28 mmol) was polymerized as described in Example 1 above to give product polyester as a tough, colorless solid (2.15 g, 87% of theory) which when molded in a Carver press at 270° C. afforded a chloroform insoluble, tough, vlexible film having a Tg=172° C. A portion of this film was annealed overnight at 200° C. to give a crystalline sample of the polymer having a Tm of 292° C., with a heat of fusion of 50.0 J/g. Based upon the method of preparation, the polyester is a polyester containing 9,9-dimethylxanthene-3,6-dioate, hexamethylene-1,6-dioxy and cyclohexane-1,4-dimethyloxy units.

Although the above examples are directed to only a few of the very many variables which can be involved in the practice of the present invention, it should be understood that the present invention is directed to the use of a much broader variety of reactants and conditions as shown in the description preceding these examples.

What is claimed is:

1. A xanthene polyester comprising chemically combined xanthene units of the formula,

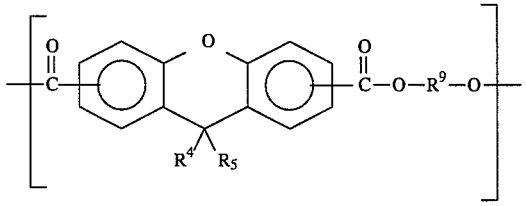

where $R^4$ and $R^5$ are selected from the same or different $C_{(1-20)}$ organic radicals, $R^9$ is divalent organic radical selected from the group consisting of a $C_{(2-10)}$ alkenyl radical, a $C_{(4-10)}$ cycloaliphatic radical and a $C_{(6-20)}$ aromatic radical.

2. A xanthene copolymer in accordance with claim 1, having from 1–90 mole percent of terephthalic acid units based on the total moles of xanthene units and terephthalic acid units in the copolymer.

3. A xanthene copolymer in accordance with claim 1, having from 1–90 mole percent of isophthalic acid units based on the total moles of xanthene units and isophthalic acid units in the copolymer.

4. A xanthene copolymer in accordance with claim 1, having from 1–90 mole percent of 2,6-naphthalene dioic units based on the total moles of xanthene units and 2,6-naphthalene dioic units in the copolymer.

5. A xanthene copolymer in accordance with claim 1, having from 1–90 mole percent of a mixture of at least two diacid units selected from the group consisting of 2,6-naphthalene dioic units, terephthalic acid units, and isophthalic acid units based on the total moles of xanthene units and diacid units in the copolymer.

6. A method for making a xanthene polyester comprising chemically combined units of the formula,

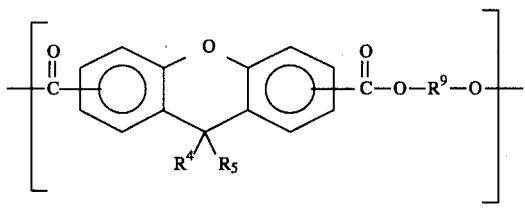

where $R^4$ and $R^5$ are selected from the same or different $C_{(1-20)}$ divalent organic radicals, $R^9$ is a divalent organic radical selected from the group consisting of a $C_{(2-10)}$ alkenyl radical, a $C_{(4-10)}$ cycloaliphatic radical and a $C_{(6-20)}$ aromatic radical comprising, (a) effecting reaction between a xanthene dicarboxylic acid, ester or acid halide included within the formula,

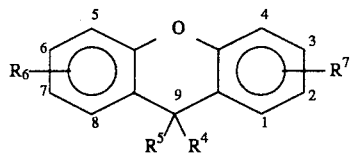

and a member selected from the group consisting of $C_{(2-10)}$ alkylene glycol, a $C_{(4-10)}$ cycloaliphatic diol, a $C_{(6-20)}$ aromatic diol, and a mixture thereof, with a dialkyl terephthalate ester in the presence of an effective amount of a transesterification catalyst and (b) heating the mixture of (a) under reduced pressure to effect the separation of volatiles, and $R^6$ and $R^7$ are selected from the group consisting of COOH, —COX and —COOR$^8$ groups, where X is a halogen radical and $R^8$ is a $C_{(1-20)}$ organic radical.

7. A polyester in accordance with claim 1, consisting essentially of chemically combined 9,9-dimethylxanthene-3,6-dicarboxy units and 1,4-butanediol units.

8. A polyester in accordance with claim 1, consisting essentially of chemically combined 9,9-dimethylxanthene-3,6-dicarboxy units, 1,4-butanediol units and terephthalate units.

9. A polyester in accordance with claim 1, consisting essentially of chemically combined 9,9-dimethylxanthene-2,7-dicarboxy units, and 1,4-butanediol units.

10. A polyester in accordance with claim 1, consisting essentially of chemically combined 9,9-dimethylxanthene-2,7-dicarboxy units, 1,4-butanediol units and terephthalate units.

11. A polyester in accordance with claim 1, consisting essentially of chemically combined 9,9-dimethylxanthene-2,6-dicarboxy units and 1,4butanediol units.

12. A polyester in accordance with claim 1, consisting of essentially of chemically combined 9,9-dimethylxanthene-2,7-dicarboxy units and trans-1,4-cyclohexanedimethanol units.

* * * * *